(12) United States Patent
Steffensen et al.

(10) Patent No.: US 8,136,824 B2
(45) Date of Patent: Mar. 20, 2012

(54) SUSPENSION ASSEMBLIES WITH BUMP STEER CONTROL

(75) Inventors: Casey Steffensen, Jackson, MN (US);
Eric Michels, Jackson, MN (US); James E. Kleven, Walnut Grove, MN (US)

(73) Assignee: AGCO Corporation, Duluth, GA (US)

( * ) Notice: Subject to any disclaimer, the term of this patent is extended or adjusted under 35 U.S.C. 154(b) by 316 days.

(21) Appl. No.: 12/194,800

(22) Filed: Aug. 20, 2008

(65) Prior Publication Data

US 2010/0044989 A1    Feb. 25, 2010

(51) Int. Cl.
*B60G 15/00* (2006.01)
(52) U.S. Cl. ................................. 280/124.145
(58) Field of Classification Search ........... 280/124.145, 280/124.147, 124.125, 89.1, 89.11, 89.12
See application file for complete search history.

(56) References Cited

U.S. PATENT DOCUMENTS

| | | | | |
|---|---|---|---|---|
| 1,760,749 | A * | 5/1930 | Gillespie | 280/93.511 |
| 1,773,986 | A * | 8/1930 | Frazier | 74/582 |
| 1,935,521 | A * | 11/1933 | Piotrowski | 280/89.12 |
| 4,101,142 | A | 7/1978 | Turner | |
| 4,871,187 | A * | 10/1989 | Schaible | 280/124.136 |
| 5,062,655 | A * | 11/1991 | Sommerer | 280/124.138 |
| 5,401,051 | A * | 3/1995 | Ivory | 280/124.145 |
| 7,384,053 | B1 * | 6/2008 | Boecker et al. | 280/124.152 |
| 2002/0053795 | A1 | 5/2002 | Schaffer | |
| 2003/0006569 | A1 | 1/2003 | Combs | |
| 2006/0027987 | A1 | 2/2006 | Prohaska | |

FOREIGN PATENT DOCUMENTS

| | | |
|---|---|---|
| CA | 234913 A1 | 11/2002 |
| DE | 1695571 U | 3/1955 |
| EP | 0332020 A | 9/1989 |
| EP | 1685988 A | 8/2006 |
| GB | 19278 A | 5/1914 |
| GB | 222109 A | 12/1924 |
| GB | 329826 A | 5/1930 |

OTHER PUBLICATIONS

International Search Report for International Application No. PCT/IB2009/006377 Published Feb. 25, 2010.

* cited by examiner

*Primary Examiner* — Faye M. Fleming

(57) ABSTRACT

A suspension assembly for an agricultural machine, adapted to reduce bump steering. The suspension assembly includes a strut shaft, a hollow tube, a cushioning mechanism, and a force control pad. The strut shaft can have an elongated body having a first end, a second end, and a middle portion, the middle portion defining a cutout. A wheel support can extend from the strut shaft and can be adapted to carry a wheel. The hollow tube can be at least partially disposed around the strut shaft and can be adapted to allow longitudinal motion of the strut shaft. The cushioning mechanism can cushion the longitudinal motion of the strut shaft. The force control pad, which can be connected to the hollow tube, can be engageable to the flat area of the strut shaft. The force control pad can impart or resist rotational force when engaged to the strut shaft.

16 Claims, 6 Drawing Sheets

SUSPENSION ASSEMBLIES WITH BUMP STEER CONTROL

BACKGROUND

Various aspects of the present invention relate to suspension systems and, moreover, to suspension assemblies with bump steer control.

An undesirable condition known as "bump steering" exists in independently suspended linkage steering mechanisms, such as those that can be used in a vehicle, such as an agricultural machine. In effect, the setting of a wheel changes undesirably when the wheel moves due to suspension, resulting in misdirection of the wheel.

BRIEF SUMMARY

There is a need in the art for a suspension assembly with bump steering control in an agricultural machine.

Briefly described, various embodiments of the present invention include a suspension assembly, and an agricultural machine utilizing same.

The suspension assembly includes a strut shaft, a wheel support, a hollow tube with a force control pad, and a cushioning mechanism.

The strut shaft can have an elongated shape having a first end, a second end, and a middle portion disposed between the first end and the second end. The middle portion can define a cutout. The cutout can define a flat surface of the strut shaft.

The wheel support can extend from a portion in proximity to one of the ends of the strut shaft. The wheel support can be adapted to couple the wheel to the strut shaft.

The hollow tube defines a hollow cavity. As a result, the strut shaft can be insertable into the hollow tube, such that the hollow tube can be at least partially disposed about the strut shaft. Based on this arrangement, the strut shaft can move longitudinally within the hollow tube. And the hollow tube can rotate about the strut shaft. The force control pad, which can be connected to, or part of, the hollow tube, can be engageable to the flat surface of the strut shaft. The force control pad can be adapted to impart or resist rotational force on the strut shaft, for example, when engaged to the strut shaft.

The cushioning mechanism can be located such that, as the strut shaft moves longitudinally in a direction away from the wheel support, the strut shaft moves toward the cushioning mechanism. The cushioning mechanism can be located generally above the strut shaft. If rough terrain causes the wheel to move upward, the strut shaft, which is coupled to the wheel, can also move. Resulting movement of the strut shaft can be longitudinal, generally upward. Accordingly, this movement can be cushioned by the cushioning mechanism.

These and other objects, features, and advantages of the present invention will become more apparent upon reading the following specification in conjunction with the accompanying drawing figures.

DETAILED DESCRIPTION

Figure 1:
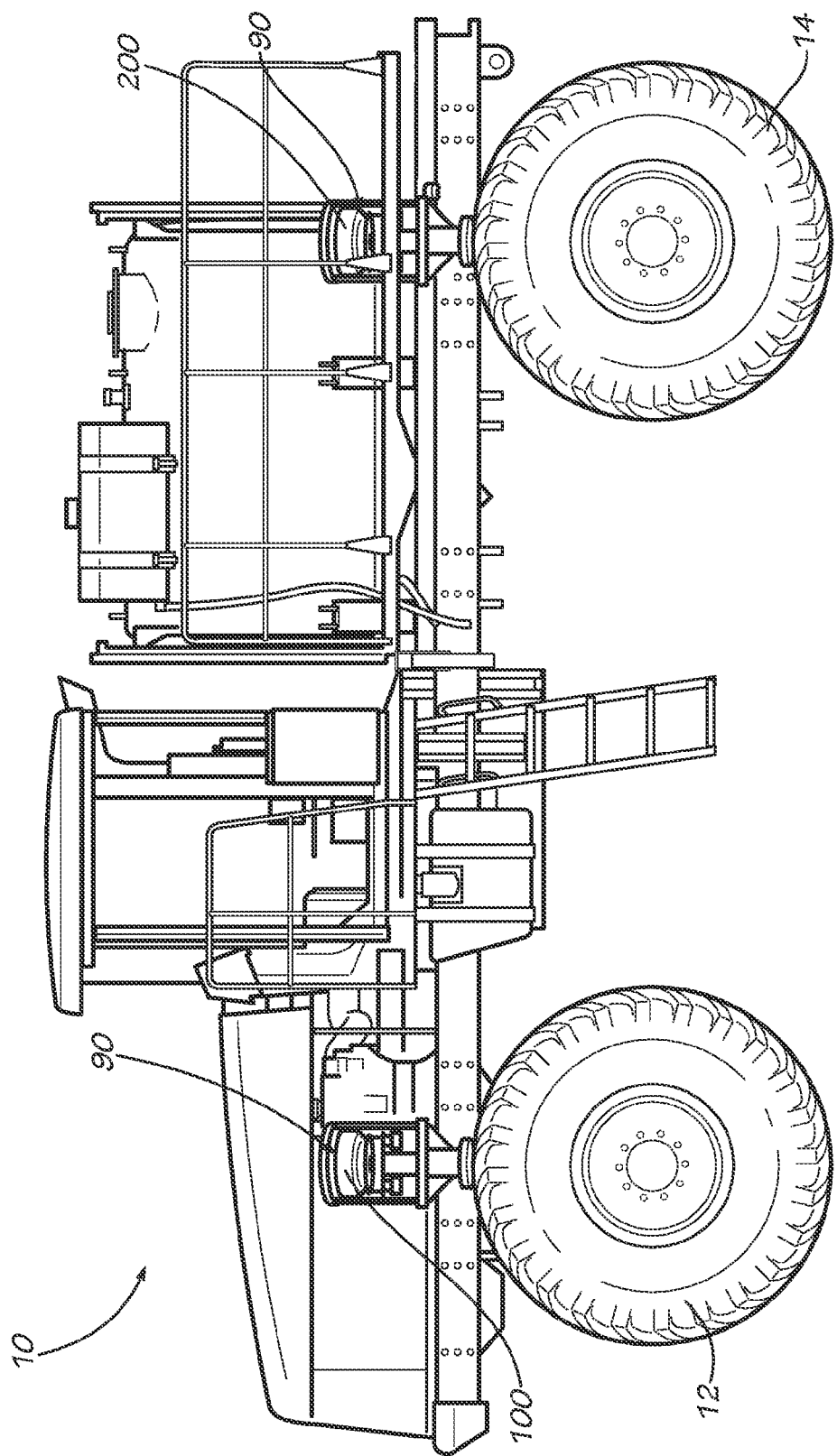
FIG. 1 illustrates a side view of an agricultural machine, in accordance with an exemplary embodiment of the present invention.

To facilitate an understanding of the principles and features of the invention, various illustrative embodiments are explained below. In particular, various embodiments of the invention are described in the context of being a suspension assembly with internal bump control for an agricultural machine or vehicle. Embodiments of the invention, however, are not limited to use in agricultural machines. Rather, embodiments of the invention can be used in many mobile machines, for example and not limitation, when a suspension with bump control is desired or necessary.

Though described herein based on figures as "up," "down," "above," "below," and "vertical," one skilled in the art would appreciate that these terms relate to movement in a single plane. That is to say that the present invention contemplates movement at vertical, horizontal, and angled trajectories, as desired. Thus, when these terms are used herein, they refer only to exemplary embodiments and are meant to identify movement within the plane, and are used to describe views of the figures.

The materials described hereinafter as making up the various elements of the invention are intended to be illustrative and not restrictive. Many suitable materials that would perform the same or similar functions as the materials described herein are intended to be embraced within the scope of the invention. Such other materials not described herein can include, but are not limited to, for example, materials that are developed after the time of the development of the invention.

Various embodiments of the present invention comprise an internal bump control, a strut suspension with internal bump control, and an agricultural machine implementing such a strut suspension. Further, exemplary embodiments can comprise a strut shaft, a cushioning mechanism, and a hollow tube.

Referring now to the figures, wherein like reference numerals represent like parts throughout the views, exemplary embodiments of suspension assembly will be described in detail.

FIG. 1 illustrates a side view of a machine 10 employing an integrated suspension assembly 90. For example, the machine 10 can be a vehicle, or more specifically an agricultural machine, such as an agricultural vehicle. In order to move or travel, the machine 10 can have at least three wheels. For example, the machine 10 can have two front wheels 12 and two rear wheels 14. The front wheels 12 are preferably steerable. The rear wheels 14 are preferably non-steerable. In one aspect, two wheels connected by an axle are either both steerable or both non-steerable.

The integrated suspension assembly 90 employed on the machine 10 can include one or more independent steerable suspension assemblies 100, along with one or more independent non-steerable suspension assemblies 200. As illustrated in FIG. 1, the front wheels 12 can be associated with the independent steerable suspension assemblies 100. Additionally, the rear wheels 14 can be associated with the independent non-steerable suspension assemblies 200.

Figure 2:
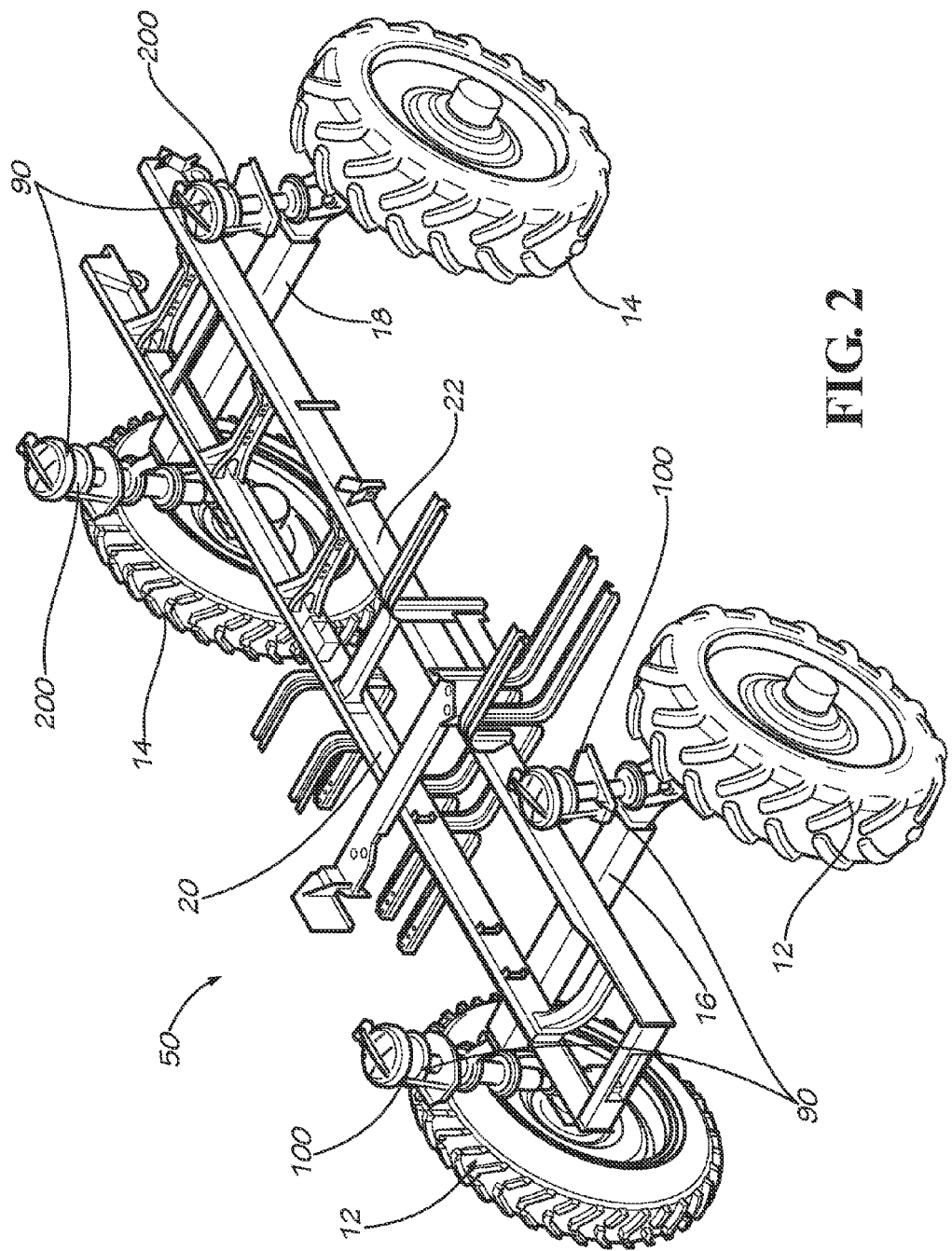
FIG. 2 illustrates a perspective view of a lower frame and steering structure of the agricultural machine, in accordance with an exemplary embodiment of the present invention.

FIG. 2 illustrates a lower frame and steering structure 50 of the machine 10. The two front wheels 12 and their respective suspension assemblies 100 can be connected to each other by a front axle 16 extending from one suspension assembly 100 to the other. The two rear wheels 14 and their respective suspension assemblies 200 can be connected by a rear axle 18 extending from one suspension assembly 200 to the other. The front axle 16 and the rear axle 18 are connected to one another by a first rail 20 and a second rail 22.

Components of the integrated suspension assembly 90, namely the steerable suspension assemblies 100 and the non-steerable suspension assemblies 200, can be positionable at the terminus ends of the axles 16 and 18. Generally, the steerable suspension assembly 100 and the non-steerable suspension assembly 200 are adapted to extend upwardly from the axles 16 and 18, as illustrated.

Steerable Suspension Assembly

Figure 3:
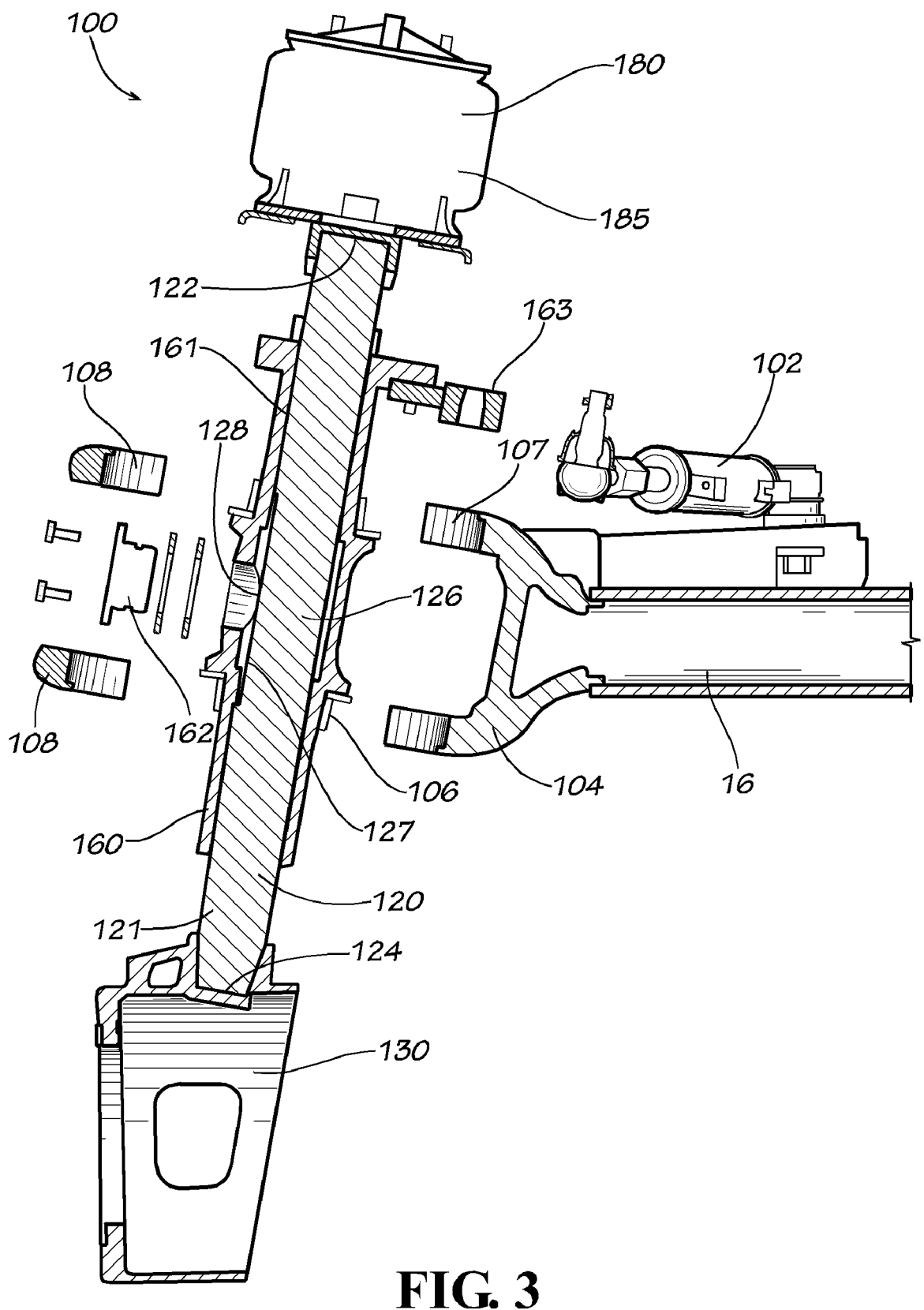
FIG. 3 illustrates a side partial perspective, partial cross-sectional, partially exploded view of a suspension assembly for a steerable wheel, in accordance with an exemplary embodiment of the present invention.

Referring now to FIG. 3, a view of the steerable suspension assembly 100 for a single steerable wheel 12 is illustrated. The steerable suspension assembly 100 can comprise a strut shaft 120, a wheel support 130, a hollow tube 160, and a cushioning mechanism 180.

Taking elements of the steerable suspension assembly 100 in turn, the strut shaft 120 can have an elongated body 121 having a first end 122, a second end 124, and a middle portion 126 disposed between the first end 122 and the second end 124. The middle portion 126 can define a cutout 127. The cutout 127 can define a flat area 128, or flat surface, of the strut shaft 120, the flat area interrupting an otherwise curved surface of the strut shaft 120. The strut shaft 120 can have round, or circular, cross-sections at its first end 122 and second end 124. Along the flat area 128, lateral cross-sections of the strut shaft 120 can each be partially arcuate with a flat side.

The wheel support 130 can be located at, or in proximity to, the second end 124 of the strut shaft 120. The wheel support 130 can extend from the strut shaft 120, or can be carried by the strut shaft 120. The wheel support 130 is coupled to, or in communication with, the associated steerable wheel 12. Accordingly, the wheel support 130 couples the wheel 12 to the strut shaft 120 and, hence, to the steerable suspension assembly 100. Further, the wheel support 130 couples the wheel 12 to the axle 16. The wheel support 130 can be located in proximity to a terminus if the axle 16.

The hollow tube 160, or steering tube, can define a hollow cavity 161. As a result, at least a portion of the strut shaft 120 can extend through at least a portion of the hollow cavity 161 of the hollow tube 160. The hollow tube 160 can be at least partially disposed around the strut shaft 120.

A force control pad 162 can be connected to, or in communication with, the hollow tube 160. Preferably, the force control pad 162 can fit through an opening in the hollow tube 160 to access the strut shaft 120. The force control pad 162 can be engageable to the strut shaft 120, particularly the flat area 128 of the strut shaft 120. Engagement of the force control pad 162 can fix the strut shaft 120 to the hollow tube 160.

When engaged, the force control pad 162 can impart or resist rotational force, thereby causing the strut shaft 120 to rotate or to retain its position according to steering of the machine 10, and not according to bump steering. The force control pad 162 can exert an adjustable degree of force on the strut shaft 120. Engagement of the force control pad 162 can fix the strut shaft 120 to the hollow tube 160 so that, as the hollow tube 160 rotates, the strut shaft 120 rotates as well. Rotation of the strut shaft 120, in turn, can rotate the wheel support 130 and cause the wheel 12 to rotate according to steering of the machine 10. Therefore, engagement of the force control pad 162 can reduce the occurrence of undesirable turning of the wheels 12.

In addition, a steering arm 163 can extend from the hollow tube 160. The steering arm 163 can be engageable to a steering member 102, or steering cylinder, which can be mounted on or in communication with the axle 16. The steering member 102 can direct the steering arm 163 by shifting the position of the steering arm 163. When the machine 10 is steered, the steering member 102 can push or pull the steering arm 163, thereby causing the hollow tube 160 to rotate. Accordingly, the hollow tube 160 can rotate relative to the axle 16 in accordance with an applied steering force. When the force control pad 162 is engaged, the strut shaft 120 can rotate along with the hollow tube 160, causing the wheel 12 coupled to the wheel support 130 to be directed in a desired direction.

The force control pad 162 can also be engaged to cause the strut shaft 120 to resist rotational force, thereby reducing undesired misdirection of the associated wheel 12. Preferably, when the machine 10 is not being affirmatively steered, the strut shaft 120 has free vertical movement without rotation, and the hollow tube 160 has free rotation without vertical movement. This can result in an independent strut suspension with no bump steer.

A yoke 104 can be carried by the axle 16. The yoke 104 can connect the hollow tube 160 to the axle 16. Bearings 106 can be positioned in grooves 107 of the yoke 104. The bearings 106 can allow the hollow tube 160 to rotate relative to the yoke 104. Additionally, yoke caps 108 can secure the yoke 104 to the hollow tube 160. The steering member 102 can be mounted on the yoke 104 instead of, or in addition to, being mounted on the axle 16. And when the machine 10 is steered, the steering tube 160 can rotate relative to the yoke 104, as well as relative to the axle 16, in accordance with an applied steering force.

The cushioning mechanism 180 can cushion movement of the strut shaft 120. To effect suspension of the machine 10, the strut shaft 120 can be adapted to translate longitudinally in the hollow tube 160. The cushioning mechanism 180 can comprise a cushioning element 185, such as an air bag. The cushioning element 185 can be positioned such that, as the strut shaft 120 moves longitudinally away from a surface, such as the ground, the strut shaft 120 moves toward the cushioning element 185. The cushioning element 185 can be disposed generally above the strut shaft 120 and in proximity to the first end 122 or the second end 124 of the strut shaft 120. As the associated wheel 12 encounters rough terrain, the wheel 12 may be pushed upward by such terrain. This, in turn, can cause the strut shaft 120 to move longitudinally in the hollow tube 160. As illustrated, the strut shaft 120 can be vertically displaced. The cushioning mechanism 180 can cushion this movement of the strut shaft 120, thereby cushioning effects of the rough terrain on the machine 10 and providing suspension.

Figure 4:
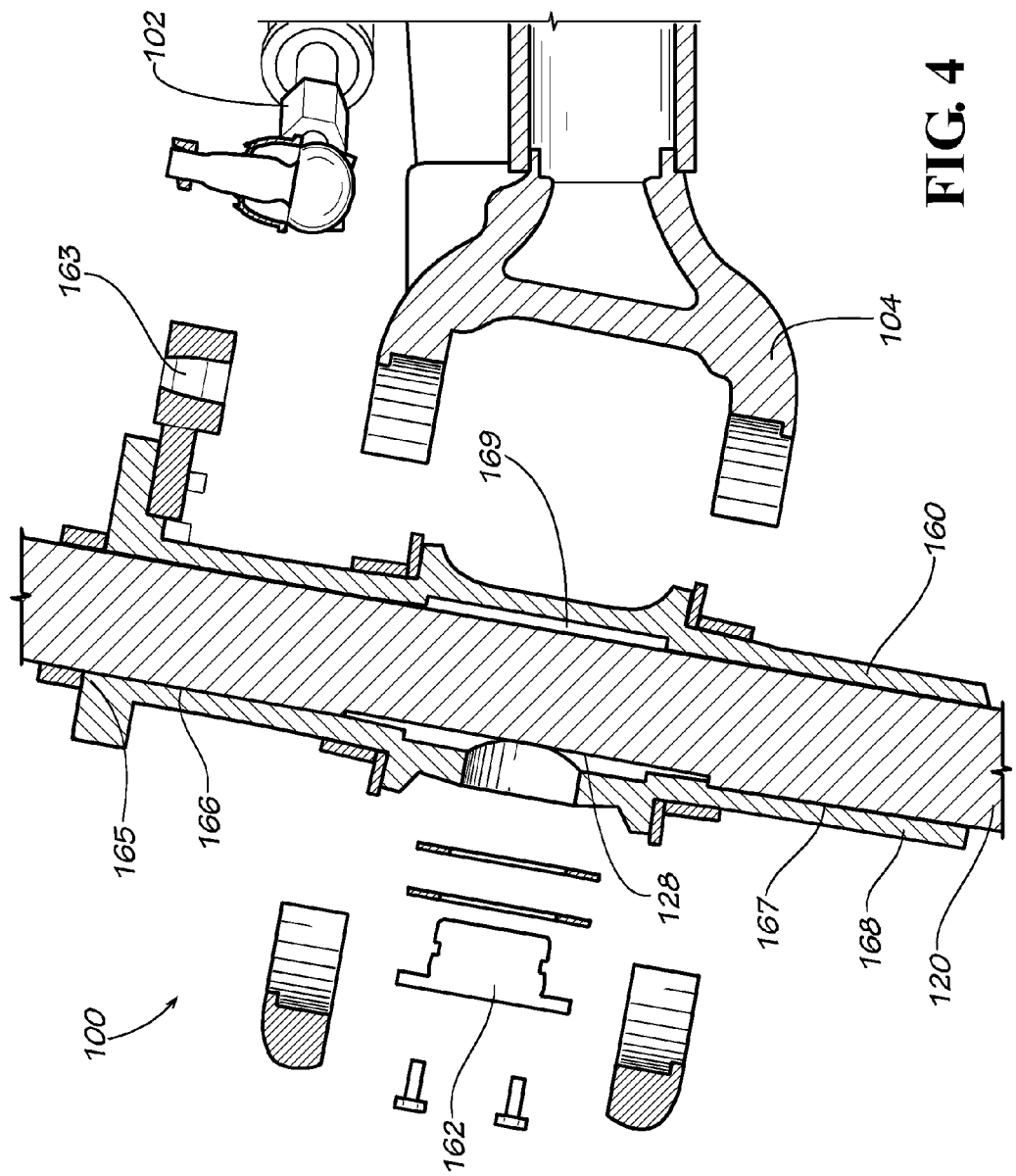
FIG. 4 illustrates another side partial perspective, partial cross-sectional, partially exploded view of the suspension assembly for the steerable wheel, in accordance with an exemplary embodiment of the present invention.

FIG. 4 illustrates a more detailed view of the steerable suspension assembly 100 for the steerable wheel 12.

As shown, an upper bushing 165 and an upper wiper seal 166 can be positioned in an upper inner portion of the hollow tube 160. The upper wiper seal 166 can be located above the upper bushing 165, but this is not required. A lower bushing 167 and a lower wiper seal 168 can be in communication with a lower inner portion of the hollow tube 160. In one embodiment, the lower wiper seal 168 can be positioned below the lower bushing 167. The bushings 165 and 167 and wiper seals 166 and 168 can guide the strut shaft 120 through its longitudinal motion in the hollow tube 160. The bushings 165 and 167 and wiper seals 166 and 168 also restrict lateral movement of the strut shaft 120. The flat area 128 of the strut shaft 120 can lie between the upper and lower bushings 165 and 167.

The hollow tube 160 can define a lubrication cavity 169 between the strut shaft 120 and the hollow tube 160. The lubrication cavity 169 can be a portion of the hollow cavity of the tube 160, such that the strut shaft 120 can abut the lubrication cavity 169 when the strut shaft 120 is inserted through the hollow tube 160. The lubrication cavity 169 is adapted to maintain a lubricating substance, such as an oil. The lubricating substance can reduce friction between the strut shaft 120 and the hollow tube 160. The lubricating substance can be grease, oil, graphite, Teflon, or many other substances that can provide lubrication.

Accordingly, the steerable suspension assembly 100 is associated with the steerable wheel 12, and provides suspension as well as bump steering control for the steerable wheel 12. The strut shaft 120 can translate longitudinally in the hollow tube 160, and the cushioning mechanism 180 can cushion this longitudinal movement to provide suspension. The force control pad 162 can impart rotational force on the strut shaft 120, thereby controlling misdirection of the steerable wheel 12 to reduce bump steering.

Non-Steerable Suspension Assembly

Figure 5:
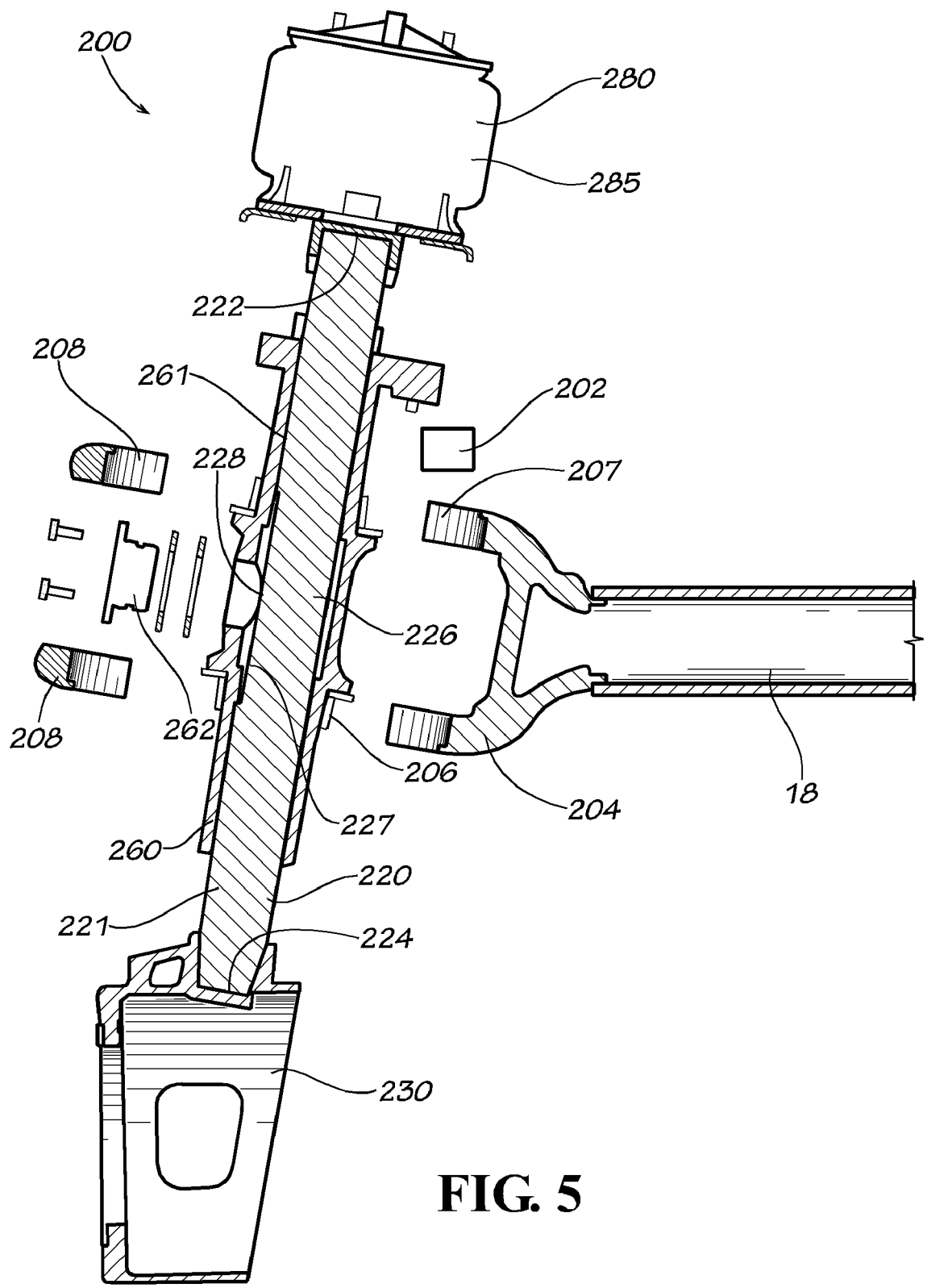
FIG. 5 illustrates a side partial perspective, partial cross-sectional, partially exploded view of a suspension assembly for a non-steerable wheel, in accordance with an exemplary embodiment of the present invention.

FIG. 5 illustrates the suspension assembly 200 for a non-steerable wheel 14. For the sake of convenient manufacturing, the suspension assembly 200 for a non-steerable wheel 14 can be similar to that for a steerable wheel 12. The non-steerable suspension assembly 200, however, excludes the steering member 102 and the steering arm 163. In place of these components, the non-steerable suspension assembly 200 can include a restraining mechanism 202, which is further described below.

Like the steerable suspension assembly 100, the non-steerable suspension assembly 200 can comprise a strut shaft 220, a wheel support 230, a hollow tube 260, and a cushioning mechanism 280.

The strut shaft 220 of the non-steerable suspension assembly 200 can have an elongated body 221 having a first end 222, a second end 224, and a middle portion 226 disposed between the first end 222 and the second end 224. The middle portion 226 can define a cutout 227. The cutout 227 can define a flat area 228, or flat surface, of the strut shaft 220, the flat area interrupting an otherwise curved surface of the strut shaft 220. The strut shaft 220 can have round, or circular, cross-sections at its first end 222 and second end 224. Along the flat area 228, lateral cross-sections of the strut shaft 220 can each be partially arcuate with a flat side.

The wheel support 230 can be located at, or in proximity to, the second end 224 of the strut shaft 220. The wheel support 230 can extend downwardly from the strut shaft 220, or can be carried by the strut shaft 220. The wheel support 230 is coupled to, or in communication with, the associated non-steerable wheel 14. Accordingly, the wheel support 230 couples the wheel 14 to the strut shaft 220 and, hence, to the non-steerable suspension assembly 200. Further, the wheel support 230 couples the wheel 14 to the axle 18. The wheel support 230 can be located in proximity to a terminus if the axle 18.

The hollow tube 260, or non-steering tube, can define a hollow cavity 261. As a result, at least a portion of the strut shaft 220 can extend through at least a portion of the hollow cavity 261 of the hollow tube 260. The hollow tube 260 can be at least partially disposed around the strut shaft 220.

The restraining mechanism 202 can fix the hollow tube 260 to the yoke 204, or to the rear axle 18, in a position relative to the yoke 204, or rear axle 18, so that no steering of the associated non-steerable wheel 14 can result. The restraining mechanism 202 prevents or reduces movement, such as rotation, of the hollow tube 260 with respect to the yoke 204, the rear axle 18, or both. Preferably, the hollow tube 260 is completely fixed with respect to the yoke 204 or the rear axle 18, or can rotate a relatively small degree with respect to the yoke 204 or the rear axle 18.

The form and positioning of the hollow tube 260 in the non-steerable suspension assembly 200 is analogous to the hollow tube 160 in the steerable suspension assembly 100. The hollow tube 260 of the non-steerable suspension assembly 200, however, is ineffective in allowing steering because of the hollow tube's 260 fixation to the yoke 204 by the restraining mechanism 202.

A force control pad 262 can be connected to, or in communication with, the hollow tube 260. Preferably, the force control pad 262 can fit through an opening in the hollow tube 260 to access the strut shaft 220. The force control pad 262 can be engageable to the strut shaft 220, particularly the flat area 228 of the strut shaft 220. Engagement of the force control pad 262 can fix the strut shaft 220 to the hollow tube 260. When the force control pad 262 is disengaged, the strut shaft 220 can have free vertical movement within the hollow tube 260.

A yoke 204 can be carried by the axle 18. The yoke 204 can connect the hollow tube 260 to the axle 18. Additionally, yoke caps 208 can secure the yoke 204 to the hollow tube 260.

As mentioned previously, in the steerable suspension assembly 100, bearings 106 can be positioned in grooves 107 of the yoke 104. The bearings 106 can allow the hollow tube 160 to rotate relative to the yoke 104. In contrast, in the non-steerable suspension assembly 200, such bearings 206 may not allow rotation of the hollow tube 260, because the restraining mechanism 202 fixes the hollow tube 160 to the yoke 204. Providing bearings 206 in grooves 207 of the yoke 204, however, can still be beneficial, as similarities between the steerable 100 and non-steerable 200 suspension assemblies can contribute to ease of manufacturing. For example, it would be desirable for the steerable 100 and non-steerable 200 suspension assemblies to be manufacturable by the same or similar processes.

The cushioning mechanism 280 cushions movement of the strut shaft 220. To effect suspension of the machine 10, the strut shaft 220 can be adapted to translate longitudinally in the hollow tube 260. The cushioning mechanism 280 can comprise a cushioning element 285, such as an air bag. The cushioning element 285 can be positioned such that, as the strut shaft 220 moves longitudinally away from a surface, such as the ground, the strut shaft 220 moves toward the cushioning element 285. The cushioning element 285 can be disposed generally above the strut shaft 220 and in proximity to the first end 222 or the second end 224 of the strut shaft 220. As the associated wheel 14 encounters rough terrain, the wheel 14 may be pushed upward by such terrain. This, in turn, can cause the strut shaft 220 to move longitudinally in the hollow tube 260. As illustrated, the strut shaft 220 can be vertically displaced. The cushioning mechanism 280 can cushion this movement of the strut shaft 220, thereby cushioning effects of the rough terrain on the machine 10 and providing suspension.

Figure 6:
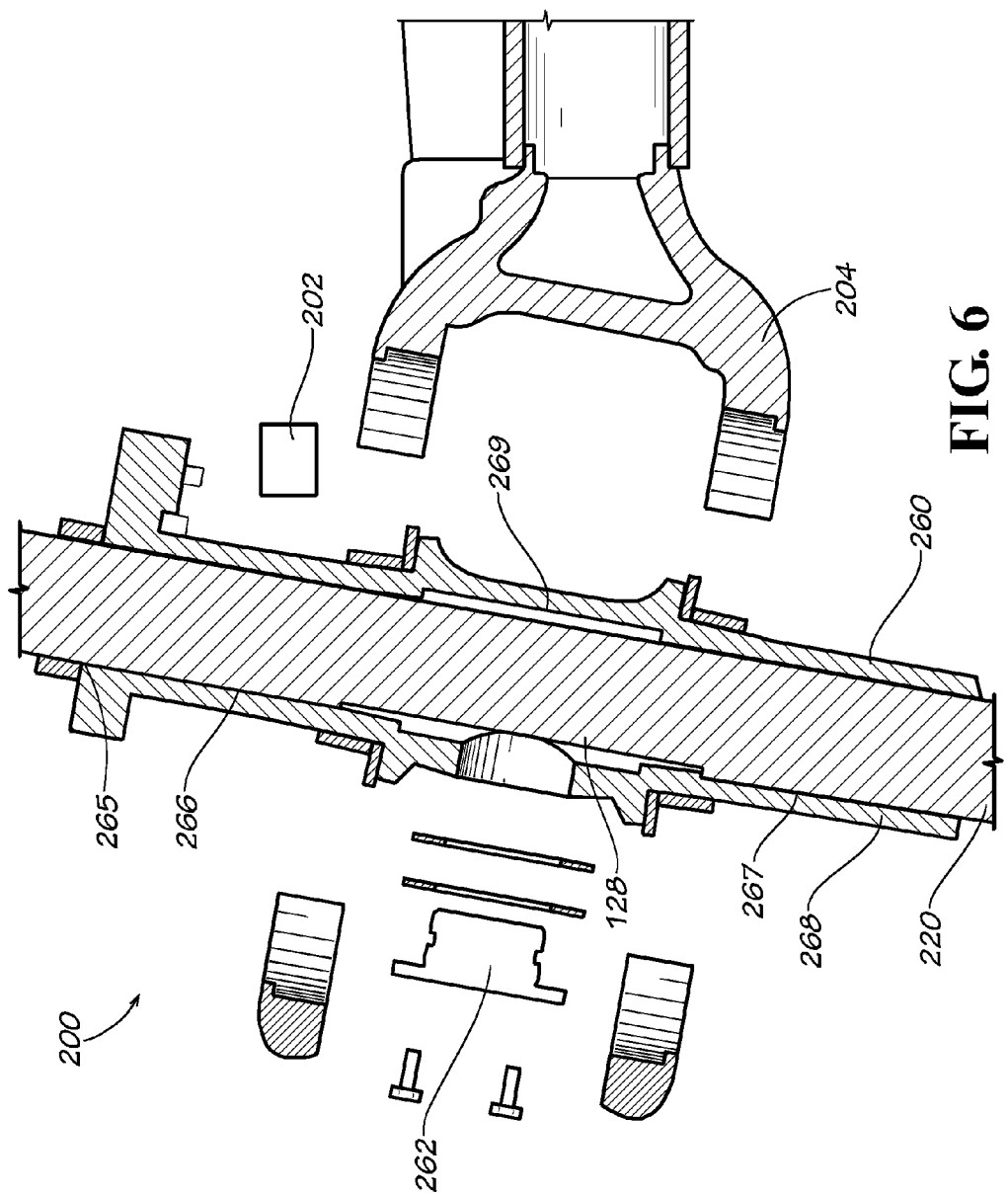
FIG. 6 illustrates another side partial perspective, partial cross-sectional, partially exploded view of the suspension assembly for the non-steerable wheel, in accordance with an exemplary embodiment of the present invention.

FIG. 6 illustrates a more detailed view of the non-steerable suspension assembly 200 for the non-steerable wheel 14.

As shown, an upper bushing 265 and an upper wiper seal 266 can be positioned in an upper inner portion of the hollow tube 260. The upper wiper seal 266 can be located above the upper bushing 265, but this is not required. A lower bushing 267 and a lower wiper seal 268 can be in communication with a lower inner portion of the hollow tube 260. In one embodiment, the lower wiper seal 268 can be located below the lower bushing 267. The bushings 265 and 267 and wiper seals 266 and 268 can guide the strut shaft 220 through its longitudinal motion in the hollow tube 260. The bushings 265 and 267 and wiper seals 266 and 268 also restrict lateral movement of the strut shaft 220. The flat area 228 of the strut shaft 220 can lie between the upper and lower bushings 265 and 267.

The hollow tube 260 can define a lubrication cavity 269 between the strut shaft 220 and the hollow tube 260. The lubrication cavity 269 can be a portion of the hollow cavity of the tube 260, such that the strut shaft 220 can abut the lubrication cavity 269 when the strut shaft 220 is inserted through the hollow tube 260. The lubrication cavity 269 is adapted to maintain a lubricating substance, such as an oil. The lubricating substance can reduce friction between the strut shaft 220 and the hollow tube 260. The lubricating substance can be grease, oil, graphite, Teflon, or many other substances that can provide lubrication.

Accordingly, the non-steerable suspension assembly 200 is associated with the non-steerable wheel 14, and provides suspension for the non-steerable wheel 14. The strut shaft 220 can translate longitudinally in the hollow tube 260, and the cushioning mechanism 280 can cushion this longitudinal movement to provide suspension. The restraining mechanism 202 fixes the hollow tube 260 in position relative to the yoke 204, so that the non-steerable wheel 14 cannot be steered.

While the suspension assembly has been disclosed in its exemplary forms, it will be apparent to those skilled in the art that many modifications, additions, and deletions can be made without departing from the spirit and scope of the invention and its equivalents, as set forth in the following claims.

What is claimed is:

1. A suspension assembly comprising:
   a strut shaft having an elongated body;
   a wheel support extending from the strut shaft and adapted to communicate with a wheel;
   a hollow tube at least partially disposed around the strut shaft, the strut shaft adapted to translate longitudinally in the hollow tube;
   a force control pad connectable to the hollow tube and engageable to the strut shaft with an adjustable degree of force, the force control pad adapted to impart or resist a rotational force when engaged to the strut shaft;
   a steering arm extending from the hollow tube; and
   a steering member in communication with an axle, the steering member adapted to shift the steering arm, thereby causing the hollow tube to rotate relative to the axle;
   wherein rotation of the hollow tube is translated to rotation of the strut shaft when the force control pad is engaged.

2. The suspension assembly of claim 1, the elongated body of the strut shaft having a first end, a second end, and a middle portion, the middle portion disposed between the first and second ends, the middle portion defining a cutout, the cutout defining a flat surface.

3. The suspension assembly of claim 1, the force control pad engageable to a flat surface of the strut shaft.

4. The suspension assembly of claim 1, wherein the hollow tube is rotatable about the strut shaft when the force control pad is disengaged.

5. The strut shaft assembly of claim 1, further comprising a cushioning mechanism adapted to cushion longitudinal movement of the strut shaft.

6. The suspension assembly of claim 5, the cushioning mechanism comprising an air bag in proximity to a first end of the strut shaft.

7. The suspension assembly of claim 1, wherein the hollow tube is adapted to rotate with respect to the axle in accordance with an applied steering force.

8. The suspension assembly of claim 1, the hollow tube defining a cavity for containing a lubricating substance.

9. A suspension assembly comprising:
   a strut shaft having a first end, a second end, and a middle portion, the middle portion disposed between the first end and the second end and having a flat surface interrupting an otherwise curved surface of the strut shaft;
   a wheel support carried by the strut shaft and adapted to couple a wheel to the strut shaft;
   a hollow tube at least partially disposed around the strut shaft;
   a force control pad in communication with the hollow tube, the force control pad engageable to the flat surface of the strut shaft;
   a steering member carried by an axle; and
   a steering arm carried by the hollow tube, the steering member engageable to the steering arm, wherein the hollow tube rotates relative to the axle as the steering member causes the steering arm to move.

10. The suspension assembly of claim 9, the force control pad adapted to impart rotational force on the strut shaft.

11. The suspension assembly of claim 10, the force control pad adapted to reduce bump steering when engaged from the flat surface of the strut shaft.

12. The suspension assembly of claim 10, the strut shaft longitudinally translatable with respect to the hollow tube.

13. The suspension assembly of claim 10, further comprising a restraining mechanism adapted to restrict rotation of the hollow tube.

14. The suspension assembly of claim 13, wherein the restraining mechanism reduces steerability of the wheel coupled to the strut shaft.

15. The suspension assembly of claim 10, the suspension assembly implemented in an agricultural machine.

16. A suspension assembly comprising:
   an axle;
   a steering arm extending from a hollow tube; and
   a steering member in communication with the axle, the steering member adapted to shift the steering arm, thereby causing the hollow tube to rotate relative to the axle;
   wherein rotation of the hollow tube is translated to rotation of a strut shaft when a force control pad is engaged.

* * * * *